United States Patent [19]

Lewis

[11] 4,122,036

[45] Oct. 24, 1978

[54] METHOD OF PYROLYZING SEWAGE SLUDGE TO PRODUCE ACTIVATED CARBON

[75] Inventor: Frederick Michael Lewis, Mountain View, Calif.

[73] Assignee: Waterfront N.V., Curacao, Netherlands Antilles

[21] Appl. No.: 757,661

[22] Filed: Jan. 7, 1977

Related U.S. Application Data

[63] Continuation-in-part of Ser. No. 683,011, May 12, 1976, abandoned.

[51] Int. Cl.² .................. C01B 31/10; B01J 21/18; C01B 31/08; C10B 51/00
[52] U.S. Cl. .................................. 252/421; 201/2.5; 201/15; 201/22; 201/25; 201/27; 201/32; 201/38; 202/106; 202/131
[58] Field of Search .............. 252/421, 444, 445; 423/449, 445; 201/2.5, 25, 3, 16, 21, 32, 15, 27

[56] References Cited

U.S. PATENT DOCUMENTS

| 1,980,828 | 11/1934 | Reed et al. | 201/3 |
| 2,008,145 | 7/1935 | Morrell | 252/421 |
| 3,275,547 | 9/1966 | Bucksteeg et al. | 201/25 |
| 3,714,038 | 1/1973 | Marsh | 201/21 |
| 3,909,364 | 9/1975 | Singh | 201/2.5 |
| 3,971,704 | 7/1976 | Klenck et al. | 201/32 |

FOREIGN PATENT DOCUMENTS 1,385,453  2/1975  United Kingdom ............... 252/421

Primary Examiner—P. E. Konopka
Attorney, Agent, or Firm—William C. Babcock

[57] ABSTRACT

A method of pyrolyzing sewage sludge to transform the same into activated carbon, with the combustible pyrogas and volatile liquids included therewith that arise from the pyrolysis operation being burned to sustain the transformation operation. A first portion of the hot activated carbon resulting from the operation is mixed with the wet sewage sludge to provide a dry sludge mixture that is subsequently subjected to the pyrolyzing operation. Water vapor that discharges as the hot activated carbon is mixed with the wet sewage sludge is heated by the burning of the pyrogas and transformed to steam. The resulting steam is in contact with the dry mixture during the pyrolyzing operation, and as a result the dry mixture is transformed to activated carbon. A second portion of the resulting activated carbon is separated from the first portion thereof, with this second portion being available for use apart from the method.

6 Claims, 1 Drawing Figure

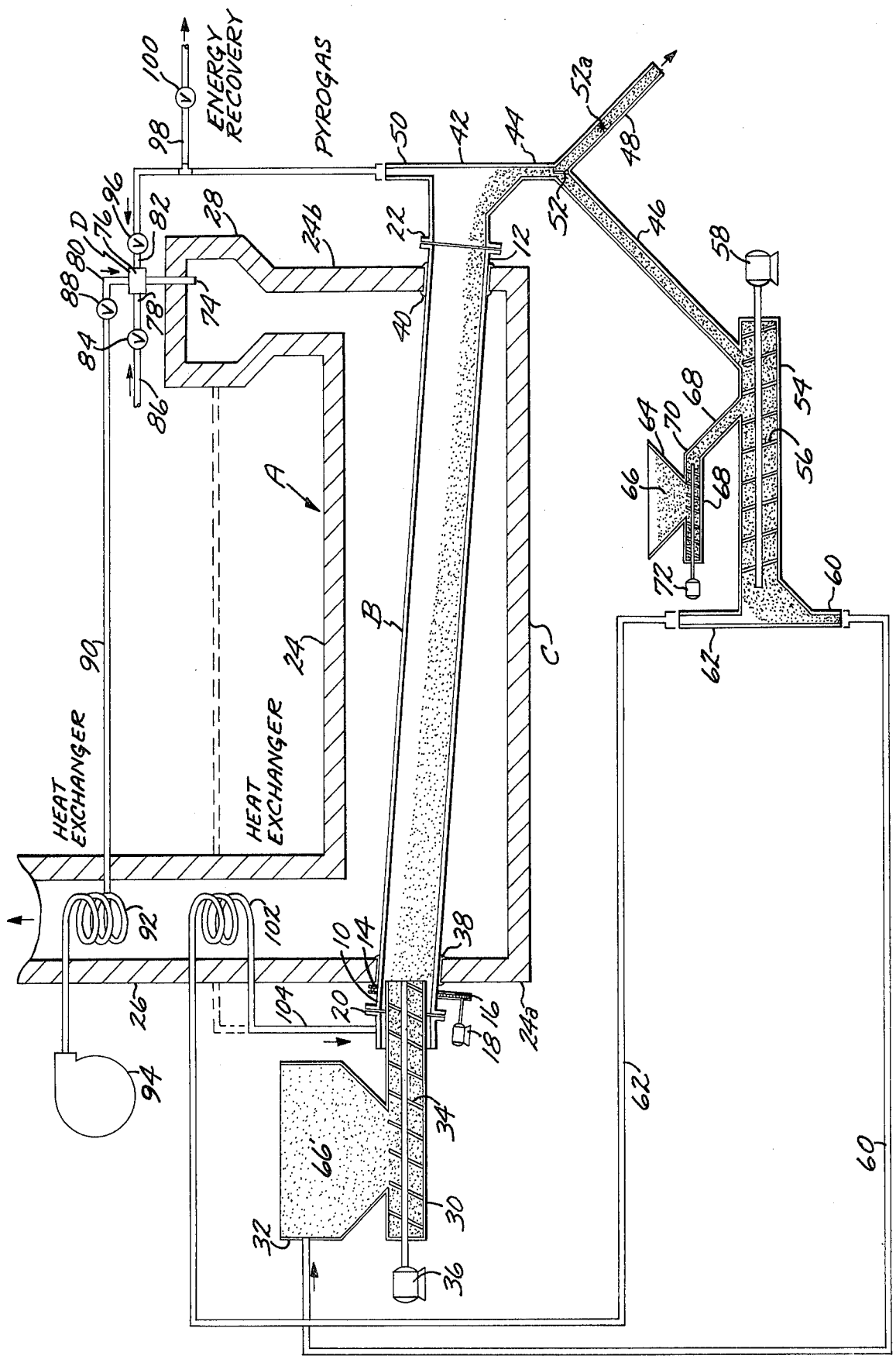

METHOD OF PYROLYZING SEWAGE SLUDGE TO PRODUCE ACTIVATED CARBON

CROSS-REFERENCE TO RELATED APPLICATION

The present application is a continuation-in-part of my co-pending application Ser. No. 683,011 entitled, "Pyrolysis System and Method of Using Same to Treat Municipal Refuse" filed in the U.S. Patent Office on May 12, 1976 now abandoned.

BACKGROUND OF THE INVENTION

1. Field of the Invention

Method of Pyrolyzing Sewage Sludge to Produce Activated Carbon.

2. Description of the Prior Art

The scarcity of acceptable land fill sites and recent incidents of beach pollution caused by ocean dumping of sludge have greatly increased the need to develop a different method for sewage sludge disposal.

One current method is to burn sewage sludge in multiple hearth and fluid bed incinerators, however, such incinerators require large quantities of auxiliary fuel and are environmentally unacceptable in some communities.

A primary purpose in devising the present invention is to supply a method of pyrolyzing wet sewage sludge that is substantially free of the operational disadvantages of prior art methods, and one that is environmentally acceptable. The present method, when carried out, produces activated carbon from the sludge that may be used to reduce solution in the water discharged from waste water treatment plants. If the sewage sludge prior to being pyrolyzed is dewatered sufficiently, a surplus of energy over and above that required to sustain the pyrolysis operation can be produced. The energy surplus is in the form of a combustible gas (pyrogas) that can be burned easily to generate steam or used to fire an internal combustion engine. Thus, the surplus energy can be used to supplement the electrical energy requirement of the treatment plant.

In the present method the sewage sludge, which is very viscous and sticky because of the high moisture content thereof, is mixed with recycled hot char resulting from practice of the method to produce a dry, free-flowing product, as well as the discharge of a substantial quantity of water vapor that is subsequently transformed to steam. The quantity of the char that must be recycled in the present method, depends on the initial sludge condition and operating condition of the apparatus used in carrying out the method. In the present method, only a first portion of the char in the form of activated carbon is recycled, with a second portion of the char in the form of activated carbon being removed from the apparatus from which the method is carried out, and this second portion being available for use in reducing the pollution in the water discharged from the waste water treatment plant. The present method has the operational advantage that heating of the ambient atmosphere adjacent the pyrolyzing operation is minimized by surplus heat from the operation being utilized to transform water to steam that is used to at least partially transform char from the operation to activated carbon. Also, a portion of the surplus heat may be used to preheat air that is mixed with the pyrogas prior to the latter being burned to sustain the pyrolysis reaction.

SUMMARY OF THE INVENTION

The present invention is a method of transforming wet sewage sludge to activated carbon a burnable pyrogas. The method includes providing an elongate confined space within an inclined rotatable cylindrical shell formed from a rigid material that has substantial heat conductivity, which shell has first and second ends, and the first end being at a substantially higher elevation than the second end. The cylindrical shell is power rotated. The cylindrical shell is initially heated from a first source of heat to a first temperature at which wet sewage sludge delivered into the confined space at the first end of the shell will be transformed to char after it has traversed the length of the confined space. A first portion of the hot char after discharge from the second end of the shell, is discharged into a second confined space while the char is still hot. Wet sewage sludge is discharged into the second confined space at a first rate to mix with the hot char. The hot char and wet sewage sludge are mixed in the confined space to obtain a substantially dry mixture, with water vapor from the second confined space being discharged therefrom. The water vapor is subsequently heated to transform the same into steam.

The dry mixture from the second confined space is continuously discharged to the first confined space adjacent the first end of the shell at a second rate that is so collected that the dry mixture is substantially transformed to char in the form of activated carbon and pyrogas after it has traversed the length of the confined space.

A second portion of the char in the form of activated carbon is recovered from the method and used part therefrom for such purposes as activated carbon is adapted.

A source of air under pressure is provided, and this air is mixed with pyrogas resulting from the pryolysis operation, and the burning of the air-pyrogas mixture provides a second source of heat to heat the shell and first confined space to a pyrolyzing temperature.

BRIEF DESCRIPTION OF THE DRAWING

The FIGURE is a diagrammatic view of an apparatus that may be used in carrying out the pyrolyzing operation of wet sewage sludge to transform the same to activated carbon:

DESCRIPTION OF THE PREFERRED EMBODIMENT

The method of the present invention may be carried out by use of an apparatus A that is illustrated diagrammatically in FIG. 1. The apparatus A includes an elongate cylindrical shell B that defines a first elongate confined space as shown in the drawing that serves as a retort and is formed from a rigid material that has good heat conductivity. The shell B includes a first end 10 and second end 12 with a ring gear being secured to the shell B, adjacent the first end thereof. The first end 10 of the shell B is at a substantially higher elevation than the second end 12 and to the extent that when the shell is rotated about the longitudinal axis of the shell (not shown), material within the confines thereof will move by gravity from the first end 10 towards the second end 12. The ring-gear 14 is engaged by a driven gear 16, which driven gear is rotated by a first prime mover 18.

The first and second ends 10 and 12 are secured to first and second rotatable seals 20 and 22. A fire box C is provided that has an elongate portion 24 and first and second end portions 24a and 24b. The first end portion 24a has a flue gas exhaust stack 26 extending upwardly therefrom. The second end portion 24b of the fire box is in communication with a compartment 28. The first rotatable seal 20 is connected to a tubular discharge outlet 30 that has a first hopper 32 in communication therewith, and the discharge outlet having a first screw conveyor 34 situated in the interior thereof, which screw conveyor is driven by a second prime mover 36. The retort shell B is rotatably supported in the portion 24 of fire box C by first and second bearing assemblies 38 and 40 as may be seen in FIG. 1. The second rotatable seal 22 is connected to a housing 42 that has a downwardly extending tubular portion 44 that develops on the lower end into first and second discharge tubes 46 and 48. A third tube 50 extends upwardly from the housing 42 as may be seen in FIG. 1. A valve 52 is situated at the junction of the discharge outlet 44, with the first and second tubes 48 and 50, to permit desired quantities of material to flow into either the first or second tubes. A valve 52a is mounted in the second tube 48 to control the flow of material from this tube.

The second tube 46 has the lower end thereof connected to the interior of a cylindrical body 54 that has a screw conveyor 56 situated within the interior thereof, and the screw conveyor being driven by a third prime mover 58. The end of the cylindrical body 54 adjacent the third prime mover 58 develops into a first tube 60 and second tube 62. A hopper 64 or other suitable receiving container is provided into which wet sewage sludge 66 may be sequentially deposited, with the hopper 64 being connected to the interior of a tubular member 68 that is in communication with the interior of the cylindrical body 54. At least a portion of the tubular member 68 has a third screw conveyor 70 rotatably supported therein which is driven by a fourth prime mover 72.

A burner assembly D is provided that has at least one jet 74 projecting into the compartment 28, and the jet being in communication with a box 76 or other enclosure that has first, second and third tubes 78, 80 and 82, projecting therefrom. The first tube 78 is connected to a first valve 84 that has a line 86 extending therefrom to a source of fuel gas (not shown). The second tube 80 is connected to a second valve 88 that has a line 90 extending therefrom to a heat exchanger 92 situated in the stack 26, which heat exchanger is heated by hot flue gases flowing upwardly through the stack 26. The heat exchanger 92 is connected to a power driven blower 94 that supplies hot compressed air to the blower assembly D. The third tube 82 is connected to a third valve 96 that is connected to the third tube 50, as may be seen in FIG. 1. The third tube 50 has a lateral tube 98 extending therefrom, which lateral tube has a valve 100 situated therein.

The second tube 62, as may be seen in the FIGURE is connected to a second heat exchanger 102 also situated within the interior of the stack 26, and this heat exchanger having a tube 104 extending therefrom through which water vapor that has been heated to steam is injected into the interior of the shell B. The first tube 60 is so arranged that it is adapted to convey material from the cylindrical body 54 to the first hopper 32.

The method of the present invention is carried out by use of apparatus A as follows:

The valve 84 is open to permit fuel to flow through the tubing 86 and 78 to the jet 74 while it it ignited. Concurrently, the blower 94 is actuated to supply compressed air to the jet 74 when the valve 88 is open. The combustion of the fuel gas and compressed air in the compartment 28 results in the interior of the fire box C being heated, together with the retort shell B, and the flue gases flowing upwardly through the stack 26 to heat the first and second heat exchangers 92 and 102. The first prime mover 18 is actuated to cause rotation of the cylindrical shell B. The method is initiated by dry sewage sludge being deposited in the hopper 32 to obtain a quantity of charcoal or carbon that discharges into the housing 42 after it has been exposed to the heat of the fire box C in traversing the length of the cylindrical shell B. The discharge of sludge into the hopper 32 is now terminated and wet sewage sludge is discharged into the second hopper 64. The fourth prime mover 92 is actuated to cause rotation of the screw conveyor 70, with the wet sewage sludge being discharged into the cylindrical body 54 to mix with hot charcoal that discharges into the cylindrical body 54 through a first tube 46 when the valve 50 is moved in appropriate position. The third prime mover 58 is actuated to cause rotation of the second screw conveyor 56. The mixture of hot charcoal and wet sewage sludge in the cylindrical body 54 results in the mixture being transformed to a substantially dry mixture, with the water vapor resulting from this transformation flowing through the second tube 62 to the second heat exchanger 102 where it is transformed into steam that is discharged into the shell B adjacent the first end 10 thereof. The second prime mover 36 is actuated to drive the first screw conveyor 34 to move dry sludge delivered to the first hopper 32 from the tube 60 into the rotating shell B adjacent the first end 10 thereof. The dry sludge is heated within the interior of the cylindrical shell B as it moves by gravity from the first end 10 towards the second end 12 of the shell B. As the dry sludge 66' is heated, it is transformed into charcoal and pyrogas, which pyrogas is a mixture of hydrocarbon gases and volatile liquid hydrocarbon. When the pyrogas is being generated in sufficient volume, the valve 96 is opened, and the pyrogas allowed to flow to the burner assembly D to supply gas to heat the interior of the fire box C. If the pyrogas is being generated in sufficient volume to provide the necessary heat, the valve 84 may be closed and the supply of fuel gas from an auxiliary source apart from the apparatus is terminated.

Should pyrogas be generated in quantities greater than that necessary to heat the interior of the fire box C to the temperature necessary to pyrolyze the dry sewage sludge 66', the valve 100 may be opened to permit pyrogas to flow to a position exteriorly of the apparatus where it may be used for energy generating purposes. Heat of combustion from the burning of the fuel in the fire box C is utilized not only to transform water vapor flowing through the second heat exchanger 102 to steam, but also to heat the compressed air from the blower 94 as it passes through the first heat exchanger 92 prior to the air being delivered to the burner assembly E. The valve 50 is utilized to regulate the rate of flow of hot carbon through the first tube 46 through the cylindrical body 54 to mix with the wet sewage sludge. If the operation of the apparatus results in the production of more hot carbon that is necessary to mix with the wet sewage sludge 66 in the cylindrical body 54, the valve 50 may be used to divert the excess hot carbon to the second tube 48. Flow of hot carbon from second tube 48 is controlled by valve 52.

The method carried out by the apparatus above-described results in the dry sludge discharged into the cylindrical retort shell B not only being transformed to charcoal, but due to steam being concurrently discharged into the shell, the produced carbon is further transformed into activated carbon. This activated carbon may be recovered from the second tube 48 in desired amounts. The balance of the activated carbon in the hot state is used to transform the wet sewage sludge 66 into dry sewage sludge 66' that is subsequently delivered to the first hopper 32.

Should it be desired, the excess pyrogas discharging through the lateral 98 when the valve 100 is opened, may be utilized as fuel for one or more internal combustion engines, which engine or engines (not shown) may be utilized for power purposes, such as the prime movers 18, 36, 58 or 72 previously identified.

The use and operation of the apparatus, and the method that may be carried out by the use of the apparatus, has been previously described in detail, and need not again be repeated.

I claim:

1. A method of transforming wet sewage sludge to a solid carbonaceous material that is at least partially activated carbon which includes the steps of:

a. providing an elongate first confined space within a rotatable cylindrical shell that has first and second ends and a longitudinal axis, said shell defined by a rigid material that has substantial heat conductivity;

b. rotating said cylindrical shell about said longitudinal axis;

c. initially heating said cylindrical shell from a first source to a first temperature at which a mixture of said wet sewage sludge and hot carbonaceous material will be transformed to char in traversing the length of said first confined space;

d. delivering a mixture of wet sewage sludge and hot carbonaceous material to said first confined space adjacent said first end of said shell;

e. moving said mixture longitudinally through said first confined space at such a rate that said sewage sludge is transformed to char prior to reaching said second end of said cylindrical shell;

f. continuously discharging wet sewage sludge at a first rate into a second confined space;

g. continuously mixing said hot char and wet sewage sludge in said second confined space to obtain a substantially dry mixture thereof, with a substantial portion of the water in said wet sewage sludge being transformed to water vapor;

h. discharging said water vapor from said second confined space;

i. heating said water vapor to transform the latter to steam that is directed into said first confined space;

j. continuously discharging said dry mixture from said second confined space to said first confined space adjacent said first end of said shell at a second rate that is so selected that said dry mixture is substantially transformed to pyrogas and char that is at least partially activated carbon in traversing the length of said confined space;

k. continuing to discharge a first portion of said char from said second end of said cylindrical shell into said second confined space;

l. recovering a second portion of said char from said second end of said cylindrical shell, which char is at least partially in the form of activated carbon for use apart from said method;

m. providing a source of air under pressure;

n. mixing said pyrogas with said air under pressure, and burning said air-pyrogas mixture to heat, said shell and first confined space to provide a second source of heat; and o. using said heat from said second source of such heat as may be necessary from said first source to maintain said shell and first confined space at a temperature to transform said dry mixture from said second confined space to pyrogas and to char at least partially in the form of activated carbon as said dry mixture traverses the length of said first confined space.

2. A method as defined in claim 1 in which said heat from said first source is by burning a mixture of fuel gas and air, with said fuel gas being from a domestic source thereof.

3. A method as defined in claim 1 in which said heat from said second source is by burning a mixture of pyrogas and pressurized air, with said pyrogas being generated during the transformation of said sewage sludge to carbon.

4. A method as defined in claim 3 in which said water vapor is transformed to steam by heat from said second source.

5. A method as defined in claim 3 in which said air is preheated by heat from said second source prior to being mixed with said pyrogas.

6. A method as defined in claim 4 in which said steam is directed into said first confined space to react with said heated carbon and at least partially transform the latter into activated carbon.

* * * * *